(12) United States Patent
Oriol

(10) Patent No.: US 8,679,693 B2
(45) Date of Patent: Mar. 25, 2014

(54) COMPACT FUEL CELL

(75) Inventor: Jean Oriol, Le Plessis Trevise (FR)

(73) Assignee: Commissariat à l'énergie atomique et aux énergies alternatives, Paris (FR)

( * ) Notice: Subject to any disclaimer, the term of this patent is extended or adjusted under 35 U.S.C. 154(b) by 171 days.

(21) Appl. No.: 13/319,825

(22) PCT Filed: May 6, 2010

(86) PCT No.: PCT/EP2010/056191
§ 371 (c)(1),
(2), (4) Date: Dec. 16, 2011

(87) PCT Pub. No.: WO2010/130630
PCT Pub. Date: Nov. 18, 2010

(65) Prior Publication Data
US 2012/0088175 A1    Apr. 12, 2012

(30) Foreign Application Priority Data

May 11, 2009    (FR) ...................................... 09 53095

(51) Int. Cl.
*H01M 8/04* (2006.01)
(52) U.S. Cl.
USPC .......................................... 429/437; 429/435
(58) Field of Classification Search
None
See application file for complete search history.

(56) References Cited

U.S. PATENT DOCUMENTS

| 2003/0180589 A1 | 9/2003 | Sarraf et al. |
| 2005/0221149 A1 | 10/2005 | Matsubayashi et al. |
| 2006/0141308 A1 | 6/2006 | Becerra et al. |
| 2006/0246332 A1 | 11/2006 | Higashi |
| 2007/0287045 A1 | 12/2007 | Lee et al. |

FOREIGN PATENT DOCUMENTS

| CA | 2 358 257 A1 | 7/2000 |
| CA | 2 465 929 A1 | 11/2004 |
| CA | 2 528 683 A1 | 6/2006 |
| EP | 1 298 754 A1 | 4/2003 |
| FR | 2 864 862 | 7/2005 |
| JP | 61-161669 | 7/1986 |
| JP | 61-260551 | 11/1986 |
| JP | 2000-353536 A | 12/2000 |
| JP | 2007-329121 A | 12/2007 |
| JP | 2008-10158 | 1/2008 |
| JP | 2008-234919 A | 10/2008 |
| JP | 2009-64643 A | 3/2009 |
| WO | WO 2004/086546 A2 | 10/2004 |

OTHER PUBLICATIONS

Machine translation of FR 2864862, Jul. 2008.*
French Preliminary Search Report issued Jan. 8, 2010, in Patent Application No. 0953095 (with English Translation of Category of Cited Documents).
Office Action issued Sep. 3, 2013 in Japanese Patent Application No. 2012-510219 with English language translation.

* cited by examiner

*Primary Examiner* — Jonathan Crepeau
(74) *Attorney, Agent, or Firm* — Oblon, Spivak, McClelland, Maier & Neustadt, L.L.P.

(57) ABSTRACT

A fuel cell including a stack of electrochemical cells, a pair of end plates located at each end of the stack of cells, and a cooling system for cooling the cells. The cooling system includes a coolant fluid circulating in closed loop through the stack and in the end plates, such that the coolant fluid exchanges heat with the end plates.

13 Claims, 1 Drawing Sheet

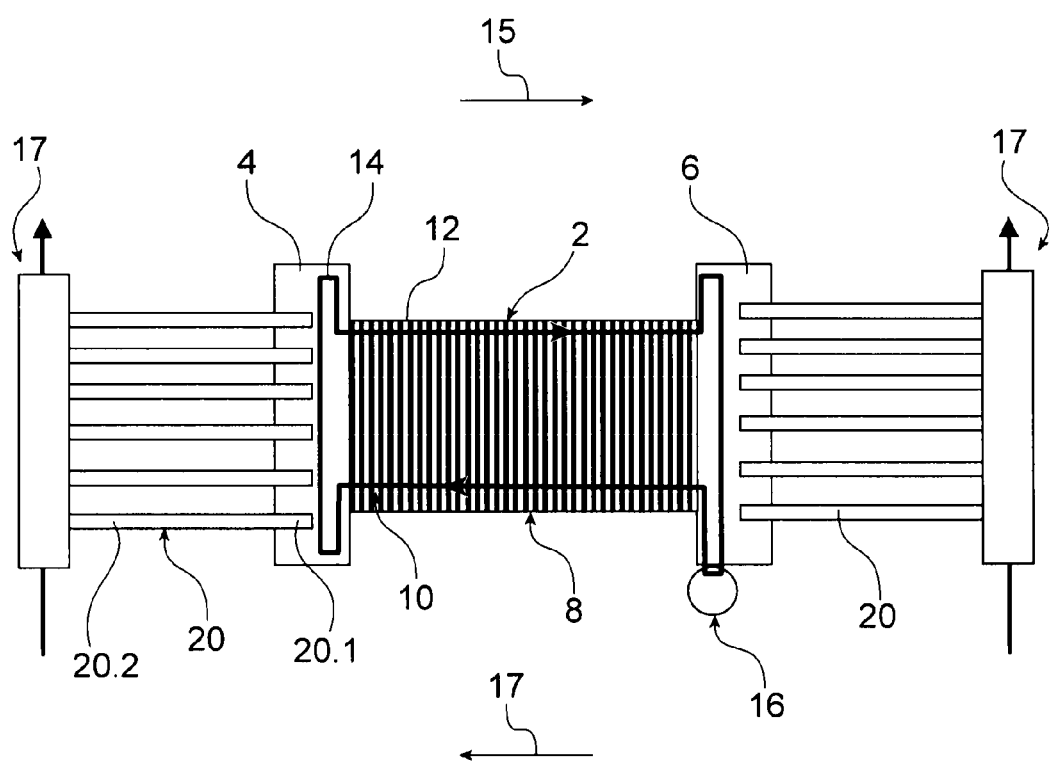

COMPACT FUEL CELL

TECHNICAL DOMAIN AND PRIOR ART

This invention relates to a compact fuel cell.

A fuel cell comprises a stack of electrochemical cells electrically connected in series and held between two clamping plates. The clamping plates physically hold the cells in place and press them into contact with each other to guarantee good electronic conductivity between the different elements making up the cells.

An exothermic electrochemical reaction usually takes place inside each electrochemical cell. The heat thus generated has to be evacuated otherwise the cell will not function well.

In the case of fuel cells with a power of more than about a hundred watts, the heat generated is evacuated by circulation of a coolant fluid inside a duct passing through the stack. This fluid is heated within the cell and then carried outside the stack where it is cooled, for example by circulating in a heat exchanger. The heat collected in the cell is either reused or dissipated. The fluid is circulated by a pump. The coolant fluid circuit is open, the fluid enters and leaves the cell.

The cooling system is large because it requires a special heat exchanger to cool the coolant fluid circulating in the stack.

Temperature variations within the fuel cell have to be limited, otherwise it will not function well. The inlet fluid temperature into the fuel cell has to be controlled to achieve this. Moreover, the internal volume of the cooling circuit is such that the quantity of coolant fluid contained is not negligible. Consequently, it is difficult to maintain a uniform temperature in a fuel cell if its functioning is variable, due to the inertia of this fluid quantity.

Furthermore, the flow of coolant fluid entering and leaving the cell may also have to be controlled. Moreover, if the coolant fluid is water, its electroconductivity has to be controlled to reduce corrosion of parts in the cooling circuit. Deionised water that has low electroconductivity is used, however impurities can enter the circuit when the circuit is opened to add cooling water, thus increasing the electroconductivity of the coolant fluid.

Document CA 2 358 257 discloses a fuel cell in which the heat exchanger is arranged between the stack of cells and one of the clamping plates. A primary coolant fluid circulates in the cells and then exits from the stack to circulate in the heat exchanger, while a secondary coolant fluid circulating outside the cell also flows inside the heat exchanger, the two fluids being separated by a metal plate. A heat exchange then takes place between the primary fluid and the secondary fluid, thus extracting heat from the primary fluid. This cell contains a large number of elements.

Another existing type of fuel cell comprises a circuit passing through the stack of cells, carrying a circulating fluid. The circuit opens up into a reservoir formed in an end plate, inside which there is a tube circulating a coolant fluid. The coolant extracts heat from the fluid passing through the cells. The presence of a heat exchange tube in a reservoir in the end plate is relatively voluminous. This tube also projects from the reservoir and passes through the end plate, which makes sealing relatively complex. Furthermore, heat extraction from the reservoir is not uniform, but takes place around the tube. Finally, the presence of the tube in the reservoir causes pressure loss in the circuit.

Another cell disclosed in document JP 61161669 comprises heat pipes passing through the stack from one side to the other, extracting heat directly. This type of cooling system is complex to make because in particular seals have to be made between each cell and each heat pipe.

There are also fuel cells in which heat pipes are inserted between the cells to extract calories from within the cell directly.

There are several disadvantages with this type of architecture. The set of heat pipes inserted in the stack in which the spacing can be variable, is closely dependent on the compression of said stack that varies with the temperature and therefore introduces additional mechanical constraints on the stack of cells but also on the heat pipes.

The heat evacuated by a heat pipe also corresponds to the heat produced by a cell. This makes it impossible to achieve good temperature uniformity in the cell because some cells may be operating under different chemical conditions for electrochemical, fluidic (gas flow) or thermal reasons.

It is also necessary to design a large number of low power heat pipes because the number of cells is usually between 50 and 200. It is usually necessary to use alcohol type fluids with a relatively high cost price, due to the temperature range used in proton exchange membrane fuel cells (between 60 and 80° C. and possibly storage/startup at below 0° C.).

There are also fuel cells in which the heat pipes are embedded in separating plates. This architecture makes it necessary to have thicker plates. Furthermore, the cost and complexity of manufacturing are increased, and finally the mechanical strength may be reduced during compression. Replacement and/or disassembly of a heat pipe also become difficult and expensive.

Consequently, one purpose of this invention is to disclose a fuel cell comprising a system of exchanging heat with the exterior, providing practically uniform cooling or heating balanced between the different cells, while having a simpler and more compact structure.

PURPOSE OF THE INVENTION

The above mentioned purpose is achieved by using a fuel cell comprising a stack of cells, end plates at the ends of the stack, a closed circuit for circulation of the coolant fluid, the circuit passing through the stack of cells and at least one of the end plates designed to form a heat accumulator, the coolant fluid releasing its excess heat to said plate, this heat being extracted later using at least one heat pipe, one end of which is placed in the end plate forming the accumulator.

In other words, at least one of the end plates is used to extract heat from the coolant fluid. Consequently, there is no longer any need for a special heat exchanger like that necessary in the state of the art. As a result, the structure of the fuel cell is simpler and more compact. Furthermore, the cooling circuit is also shorter and simpler and therefore heat losses are reduced.

In one particularly advantageous embodiment, heat is extracted from the end plate using heat pipes, such that the clamping plate and therefore the fluid are quickly cooled.

The heat pipe(s) comprise(s) one end located in the end plate, which does not open up into the heat transfer circuit.

If the coolant fluid circulates in the two end plates, heat is evacuated particularly efficiently because it is evacuated from two different locations on the fluid circulation path. The fluid passes through the stack of cells once, then passes through one of the two end plates in which it is cooled. It then passes through the entire stack of cells once again and penetrates into the other end plate in which it is cooled. Therefore the coolant fluid is less heated between two transfer zones, i.e. its temperature varies less along its path thus making the temperature more uniform in all cells. This heat extraction at two opposite positions in the circuit enables almost uniform cooling of the stack. Due to this specific embodiment of the invention, the coolant fluid is cooled between the two ends of the stack. Consequently, the cells at the two ends of the stack are cooled in a very similar manner.

Therefore, with the invention, more efficient cooling of the cells becomes possible while reducing the size of the fuel cell. Two special heat exchangers would be necessary to make two cooling zones in a known type of fuel cell, which would require the use of two coolant fluid inlets and outlets in the cell. The cost, complexity and size of such a cell would be considerably increased.

With the invention, the size and the number of elements forming the cell are smaller because the end plate(s) squeeze(s) and cool(s) the cells. This simplifies the cell structure. The temperature within the cells is made more uniform directly due to the very circulation of the coolant fluid. Furthermore, since the coolant fluid circuit is closed, the cell does not require any control over the fluid flow and temperature. Only one circulation pump is required, with conventional means for a hydraulic circuit such as valves or an expansion vessel.

Pressure losses are reduced because the coolant fluid circulates in a single circuit and the passage in the end plate(s) is hydraulically <<transparent>> because the fluid does not exit from the circuit to flow through a heat exchanger.

The subject-matter of this invention is thus mainly a fuel cell comprising a stack of electrochemical cells, a pair of end plates located at each end of the stack of cells, a system for cooling said cells, the cooling system comprising a coolant fluid circulating in closed loop through the stack and in at least one of the end plates, the coolant fluid penetrating into said end plate, when it exits from the cell in contact with one of the end plates, circulating in the end plate and, when it exits from the end plate, penetrating directly into said cell in contact with said end plate, such that the coolant fluid as it circulates in the end plate exchanges heat with said end plate, said fuel cell also comprising means for exchanging heat between the outside and the at least one end plate, said means comprising at least one heat pipe.

The coolant fluid also advantageously circulates in the other end plate so that it can also exchange heat with this other end plate.

One end of the heat pipe can then penetrate into said at least one end plate. The other end of the heat pipe can exchange heat with the air or a heat exchanger in which another coolant fluid is circulating.

The cell may comprise several heat pipes distributed along the path of the coolant fluid inside the end plate.

Advantageously, the passage cross-section of the cooling circuit is approximately constant between the crossing through the cells and the crossing through the end plate(s), so as to reduce pressure losses in the cooling circuit.

The coolant fluid circulates in several channels in the end plate(s).

BRIEF DESCRIPTION OF THE DRAWINGS

This invention will be better understood after reading the following description and the single FIGURE representing a fuel cell according to this invention.

DETAILED PRESENTATION OF PARTICULAR EMBODIMENTS

The single FIGURE shows an example fuel cell according to this invention, comprising a stack of electrochemical cells 2 and end plates 4 and 6 located at the ends of the stack.

Each electrochemical cell comprises a positive and a negative electrode and an electrolyte placed between the two electrodes. These electrochemical cells will not be described in detail because they are well known to those skilled in the art.

This invention will be disclosed mainly for the case in which the fuel cell is cooled, but this invention would be equally applicable if the fuel cell were heated.

The end plates 4, 6 apply a squeezing force on the stack to maintain good contact between the different elements of the cells. Ducts (not shown) also pass through the end plates 4, 6 to supply the different cells and to collect any gases produced.

The fuel cell also comprises a system 8 that will extract heat produced within the cell during its operation.

According to this invention, the system 8 comprises a closed circuit 10 formed in the cells and in the end plates. This closed circuit is formed from a pipe 12 inside which a coolant fluid circulates and a duct 14 formed in the end plates. The pipe 12 passes through the cells 2 from one side to the other and is connected to the ends of the duct 14. The fluid circulates in the direction of the arrow 15, then into the end plate 6, then from said plate into the stack, passes through the stack in the direction of the arrow 17 towards the other end plate 4, passes through the plate 4 and then circulates in the stack again in direction 15.

The coolant fluid may be water or organic depending on the materials with which it comes into contact. It may be deionised water. Ethylene glycol can be added to the deionised water to protect the system from frost when it is not functioning. Oil can also be used.

A hydraulic pump 16 is also provided to move the coolant fluid inside the closed circuit. Other conventional elements like valves or an expansion vessel are also provided and will not be described in detail herein.

Means 17 are also provided to extract heat from the end plates.

Particularly advantageously, the heat extraction means 18 are formed by heat pipes 20 as shown in the single FIGURE. An end portion 20.1 of each heat pipe penetrates into the end plate on the face that is not in contact with a cell. The other end portion 20.2 is cooled by any type of means, for example by a secondary circuit in which a coolant fluid flows, or by natural convection or forced convection type aerothermal means. The end portions of the heat pipe(s) do not penetrate into the duct 14.

The means 17 could also be a secondary coolant fluid circulating in the end plate to extract heat that the coolant fluid circulating in the stack has transferred to the plate.

The heat pipes and the fluid contained in the heat pipes are chosen as a function of the temperature reached in the core of the combustion cell. For example, five heat pipes with an outside diameter of 16 mm will be used if the temperature in the core of a 5 kW cell is to be kept at about 80° C.

The use of a heat pipe associated with the use of at least one end plate as accumulator is particularly advantageous because it enables fast passive extraction of heat. A heat pipe has a very high thermal conductivity (of the order of 40 times higher than copper) for a given operating range. Consequently, since the coolant fluid is circulated in closed circuit solely in the stack and in the plate, its volume is reduced, and when using this coolant with heat pipes, the total thermal inertia of the cooling system is reduced. This makes cooling of the cell faster than with a conventional architecture.

The end plates 2, 4 form heat accumulators and absorb the additional heat brought in by the primary coolant fluid flowing in the ducts 14 formed in the end plates. This accumulated heat is then evacuated through the heat pipes.

The channel 14 formed in the end plate is designed to limit the pressure loss in the circuit 10. This is done by making the cross-section of the channel approximately the same as that of the pipe 12. It could be arranged that the channel is formed from a single duct in which the passage cross-section is approximately the same as that of the pipe 12, or several channels could be used with the same total passage cross-section as that of the pipe 12. In the latter case, the exchange area between the primary coolant fluid and the end plate is greater, therefore the heat quantity transferred from the fluid to the plate is higher. Since the heat pipes do not penetrate into the channel 14, they do not hinder the flow through it.

It would also be possible to make a chamber inside the plate filled with coolant fluid and connected to pipe 12, this fluid volume forming a buffer volume of coolant fluid.

Obviously, more than one duct could be provided for circulation between the cells.

The use of heat pipes for heat exchanges between the end plate and the outside environment has the advantage that the heat pipe(s) can be arranged on the five faces of the end plate other than the surface facing the last separating end plate. Therefore, it allows freedom of orientation of the heat pipes and the number of heat pipes that can be inserted in the plate. It also provides some freedom with the shape of the heat pipe(s) because it is independent of the shape of the separating plates. The result is that the cost price of the heat pipe(s) is reduced.

The thickness of the end plates can be increased to insert heat pipes in them, independently of the stack.

The combination of heat pipes and a system in which liquid passes through the stack guarantees good thermal homogeneity in all cells.

A metal, for example steel, is chosen as the material used for the end plates to give good heat conduction. Advantageously, the end plates are made of aluminium which reduces the weight of the cell structure. A synthetic material containing metal or carbon conducting particles could also be used to make the end plates.

In the example shown, the two end plates are used to extract heat from the cell. But it is quite obvious that a cell in which a single plate is used to extract heat is not outside the scope of the invention.

We will now describe how cooling takes place in the cell according to this invention. We will consider the path of a volume of coolant fluid, knowing perfectly well that the circuit is completely filled with coolant fluid and that heat is extracted continuously.

The fuel cell, and particularly the stack of cells, warms up during operation. The coolant fluid circulates in the closed circuit, driven by the pump. A volume of coolant fluid passes through all cells in the stack before reaching an end plate, and as it moves, it absorbs heat that it will transfer to the end plate that is itself permanently cooled by the heat pipes. The fluid volume transfers heat continuously as it passes through the end plate. The coolant fluid then penetrates in the stack, once again collects heat and penetrates into the other end plate to which it will transfer its heat. Consequently, there are two steps of cooling the coolant fluid during one complete circulation in the stack. Consequently, the extracted thermal power is more than in known systems in which there is only one cooling step. Furthermore, the heat pipes provide faster heat transfer than in the case of a secondary circuit in which a coolant fluid circulates.

Moreover, since the temperature of the coolant fluid increases less between two cooling steps, heat is extracted more homogeneously as the coolant fluid passes through the stack.

Operation is similar when it is required to increase the temperature, in this case the fluid collects heat in the plates and transfers it to the cells.

This invention offers a simple solution to obtain a homogeneous temperature inside the cell, due to continuous circulation of the primary coolant fluid in its core. Furthermore, since the fluid is confined in the cell, there is no need to control the fluid temperature. All that is necessary is to control the temperature in the core of the cell.

Furthermore, the dimensions and manufacturing complexity are significantly reduced since manufacturing does not comprise any additional element specifically added to remove heat because the end plates are used to transfer heat to the outside.

Moreover, the use of heat pipes associated with a smaller volume of coolant fluid enables fast extraction of heat. Moreover, due to the high thermal conductivity of the heat pipes, operation in the case of a cell with variable operation is significantly improved since temperature variations inside the stack can be managed more easily.

Furthermore, the arrangement of end portions of heat pipes along the fluid flow in the end plates enables optimum extraction of heat. A different heat pipe extracts heat in each zone through which the fluid passes in the end plate, rather than the same fluid being heated as in the case of a heat exchanger.

Moreover, the fact of circulating the coolant fluid in a completely closed circuit reduces the risks of increasing the electroconductivity of the fluid.

This invention can result in a cooling circuit with a low pressure loss, for example a maximum pressure loss of 150 mbars is measured for a cell generating 5 kW of electricity. Therefore the energy necessary to circulate the fluid under stable conditions is reduced.

The heat extraction system can be reversible. It can be used to heat the core of the fuel cell, or to maintain the core temperature of the fuel cell at a given temperature if the thermal energy output by the exothermic reactions is insufficient to maintain this temperature or non-existent. Heat pipes can do this by transferring heat from the outside to the end plates, this heat being collected by the primary coolant fluid circulating in the end plates.

The invention claimed is:

1. A fuel cell comprising:
a stack of electrochemical cells;
first and second end plates located at each end of the stack of cells;
a cooling system for cooling the cells, the cooling system comprising a coolant fluid circulating in closed loop through the stack and in the first end plate, the coolant fluid penetrating into the first end plate when the coolant fluid exits from a first cell in contact with the first end plate, circulating in the first end plate and, when the coolant fluid exits from the first end plate, penetrating directly into the first cell in contact with the first end plate, such that the coolant fluid, during circulation in the first end plate, exchanges heat with the first end plate; and
at least one heat pipe for exchanging heat between the outside and the first end plate.

2. The fuel cell according to claim 1, wherein the coolant fluid circulates in the second end plate so that the coolant fluid exchanges heat with the second end plate.

3. The fuel cell according to claim 1, wherein a first end of the heat pipe penetrates into the first end plate.

4. The fuel cell according to the claim 3, wherein a second end of the heat pipe exchanges heat with the air or a heat exchanger in which another coolant fluid is circulating.

5. The fuel cell according to claim 1, comprising plural heat pipes distributed along the path of the coolant fluid inside the first end plate.

6. The fuel cell according to claim 1, wherein a passage cross-section of the cooling circuit is approximately constant between the crossing through the cells and the crossing through the first end plate.

7. The fuel cell according to claim 1, wherein the coolant fluid circulates in several channels in the first end plate.

8. The fuel cell according to claim 1, wherein the first end plate comprises a chamber filled with coolant fluid through which a duct passes carrying the coolant fluid circulating through the cells.

9. The fuel cell according to claim 1, wherein the first end plate comprises aluminium.

10. The fuel cell according to claim 1, wherein the stack of cells is sandwiched between the first and second end plates and the first and second end plates apply a squeezing force on the stack of cells.

11. The fuel cell according to claim 1, wherein the coolant fluid penetrating into the first end plate when the coolant fluid exits from the cell in contact with the first end plate flows in a first direction, and the coolant fluid exiting from the first end plate and penetrating directly into the cell in contact with the first end plate flows in a second direction opposite the first direction.

12. The fuel cell according to claim 11, wherein a portion of the coolant fluid circulating in the first end plate flows in a third direction which is perpendicular to the first and second directions.

13. The fuel cell according to claim 3, wherein the first end of the heat pipe penetrates into a face of the first end plate which is free of contact with the first cell.

* * * * *